(12) United States Patent
Yelles

(10) Patent No.: US 7,845,182 B2
(45) Date of Patent: Dec. 7, 2010

(54) FAN CONTROL LIMITATION LOGIC IN AUTO DEFOG SYSTEM

(75) Inventor: Daniel Yelles, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 951 days.

(21) Appl. No.: 11/627,080

(22) Filed: Jan. 25, 2007

(65) Prior Publication Data

US 2008/0178620 A1 Jul. 31, 2008

(51) Int. Cl.
*F25B 49/00* (2006.01)
*F25D 21/00* (2006.01)

(52) U.S. Cl. .................. 62/176.6; 62/176.2; 62/150

(58) Field of Classification Search ............ 62/176.6, 62/176.2, 150, 151; 236/44 A, 44 C; 73/335.02
See application file for complete search history.

(56) References Cited

U.S. PATENT DOCUMENTS

| 4,412,424 A | 11/1983 | Iida et al. |
| 5,971,844 A | 10/1999 | Samukawa et al. |

| 2005/0121185 A1 | 6/2005 | Yonekura et al. |
| 2006/0004494 A1 * | 1/2006 | Errington .................. 701/1 |

FOREIGN PATENT DOCUMENTS

| JP | 63-271051 | 11/1988 |
| JP | 2003-175719 | 6/2003 |

* cited by examiner

*Primary Examiner*—Chen-Wen Jiang
(74) *Attorney, Agent, or Firm*—Mark E. Duell; Rankin Hill & Clark LLP

(57) ABSTRACT

A method for controlling a vehicle HVAC system to automatically defog a window and to prevent fogging or condensation of the window. In-cabin air temperature and relative humidity are used to determine a dewpoint. Further, ambient or outside air temperature is measured. Window glass temperature is either estimated/calculated or can be measured. A fog margin, which is based upon the difference between the dewpoint and the window temperature, is calculated. When the ambient air temperature is below a predetermined temperature, a corrected fog margin is substituted for the calculated fog margin. When this occurs, the controller operates a fan at a reduced voltage, and hence at a reduced speed, as compared to if the controller used the calculated fog margin. Using the corrected fog margin prevents a vehicle user from being exposed to excessive fan noise or air currents during low or cold ambient air temperatures.

8 Claims, 3 Drawing Sheets

FAN CONTROL LIMITATION LOGIC IN AUTO DEFOG SYSTEM

BACKGROUND OF THE INVENTION

1. Field of the Invention

The present invention is directed toward a method for controlling a vehicle heating, ventilation, and air conditioning (HVAC) system. In particular, the present invention relates to automatically sensing fogging conditions, and instituting adequate measures to effectively prevent/remove fogging, while not overreacting during low or cold ambient weather.

2. Description of Related Art

In modern vehicles it is common to have an HVAC system for a user compartment (hereinafter "cabin"). The HVAC system provides warm and cool air to the cabin of the vehicle and allows users to select a set temperature for the cabin. Once the set temperature is selected, the HVAC system will provide conditioned air to adjust the climate of the cabin to the set temperature. Further, the HVAC system is used to eliminate fog or condensation that appears on the vehicle windows.

In conventional automobile control systems, application of remedial measures to combat fogging of the vehicle windows is manually instituted by the vehicle passengers. Naturally, such remedial measures, which primarily consist of operating the HVAC system in a defrost mode, are employed after a fogging condition has developed, and typically require some time to alleviate the fogging condition. As will be appreciated, such systems are not suitable for automatic control, and do not anticipate impending fogging conditions.

In vehicles incorporating an automatic HVAC control system, internal and external conditions are sensed to determine whether fogging is likely. Such systems rely on knowing the window temperature and cabin conditions, namely cabin temperature and cabin relative humidity. After determining cabin temperature and cabin relative humidity, a dewpoint of the vehicle is known. In addition, the window temperature is determined by measurement or by estimation/calculation.

Then a fog margin, which is the difference between the cabin dewpoint and the measured or estimated/calculated glass temperature, is determined. The lower the value of the fog margin, the more likely that fogging of the window will occur. The fog margin is then used to control the HVAC system. Unfortunately, such known systems may overestimate the amount of air that is needed from the defroster in low or cold ambient temperatures to prevent/remove the fog. One of the reasons for this is the potential for error when the relative humidity is being measured during cold ambient air temperatures. Most automotive interior humidity sensors experience difficulty in accurately measuring the relative humidity at values less than 10% during these cold ambient air temperatures. Accordingly, the resultant dewpoint may be too large, thereby creating an artificially low fog margin. Thus, this artificially low fog margin can produce a false positive for fog presence thereby exposing the user to unnecessary noise from the fan and also excessive air currents from the fan that is operating at an increased speed to reduce/eliminate the nonexistent fog.

Therefore, there exists a need in the art for a method to better control the HVAC system so as to adequately detect and act upon possible fog conditions during low or cold ambient air temperatures.

SUMMARY OF THE INVENTION

The present invention is directed toward a method to prevent fogging conditions from occurring in a vehicle during cold ambient air temperatures.

In accordance with one aspect of the invention, a method for calculating a vehicle window glass temperature ($T_{glass}$) is provided. The method employs existing sensors and estimates/calculates the glass temperature ($T_{glass}$) based upon the vehicle speed ($V_{sp}$) and the ambient air temperature ($T_{am}$).

In accordance with another aspect of the invention, a method for measuring a vehicle window glass temperature ($T_{glass}$) is provided. The method employs a sensor to measure the temperature of the window glass.

Further according to the present invention, a method for determining a control parameter, which may be used by a vehicle HVAC system to predict the potential for vehicle fogging, is provided. A fog margin (FM) is calculated based on a difference between a dewpoint ($T_{dp}$) of air within the vehicle cabin and the window glass temperature ($T_{glass}$). Depending upon an ambient air temperature ($T_{am}$), either the calculated fog margin (FM) or a corrected fog margin (FM') is used as the control parameter. According to the invention, when the ambient air temperature ($T_{am}$) is low ($\leq T_{min}$), the corrected fog margin (FM'), which is experimentally determined and based on the calculated fog margin (FM), is preferably selected from a lookup table. It is noted that the corrected fog margin (FM') is larger in value than the calculated fog margin (FM). When the corrected fog margin (FM') is used by the controller, the controller operates the fan at a reduced voltage and thus at a reduced speed as compared to if the calculated fog margin (FM) were used. Alternatively, if the ambient air temperature ($T_{am}$) is not low ($>T_{min}$), the calculated fog margin (FM) is used by the controller to operate the fan at a non-reduced voltage and speed.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
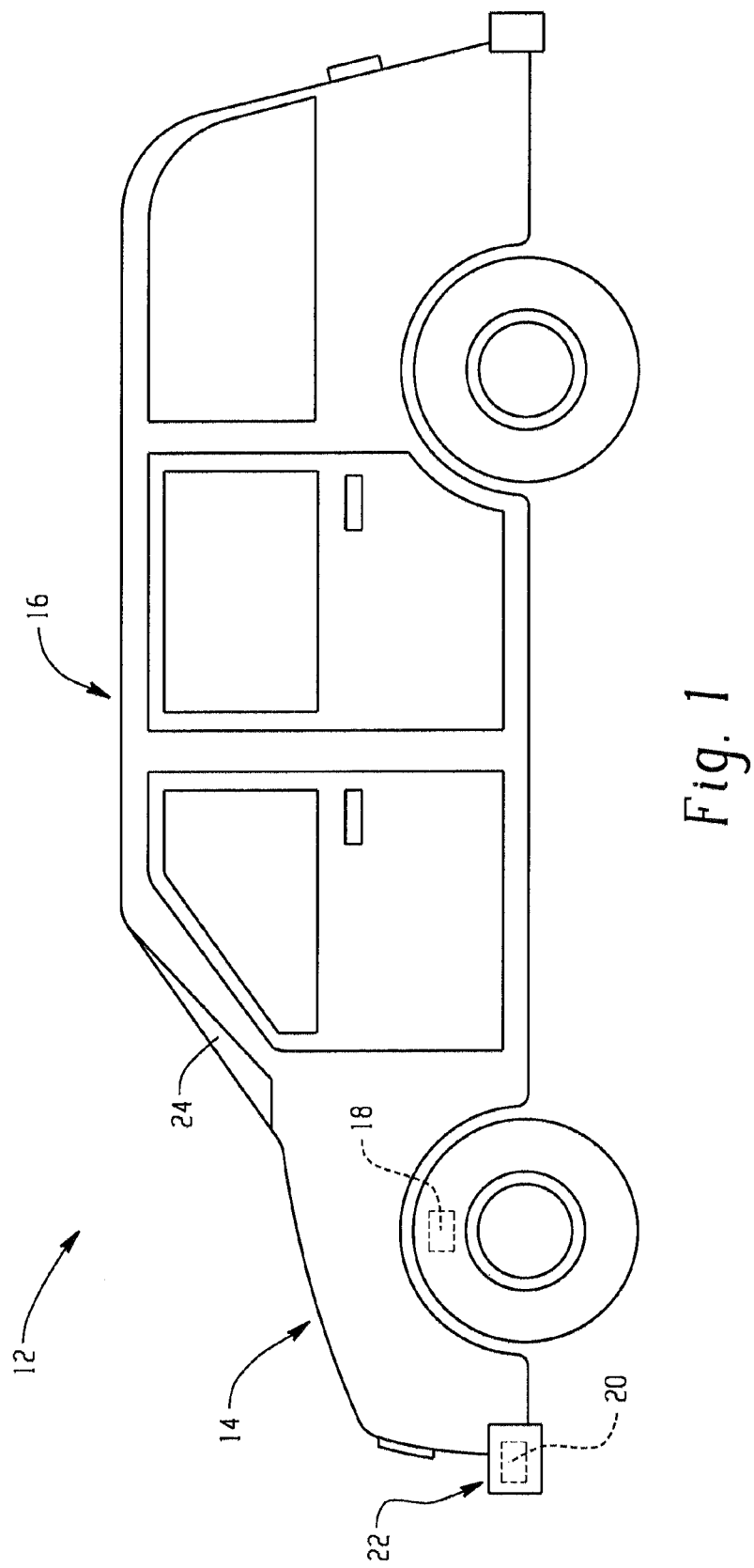
FIG. 1 is a side view of a vehicle with an automatic defogging control system of the present invention.
Figure 2:
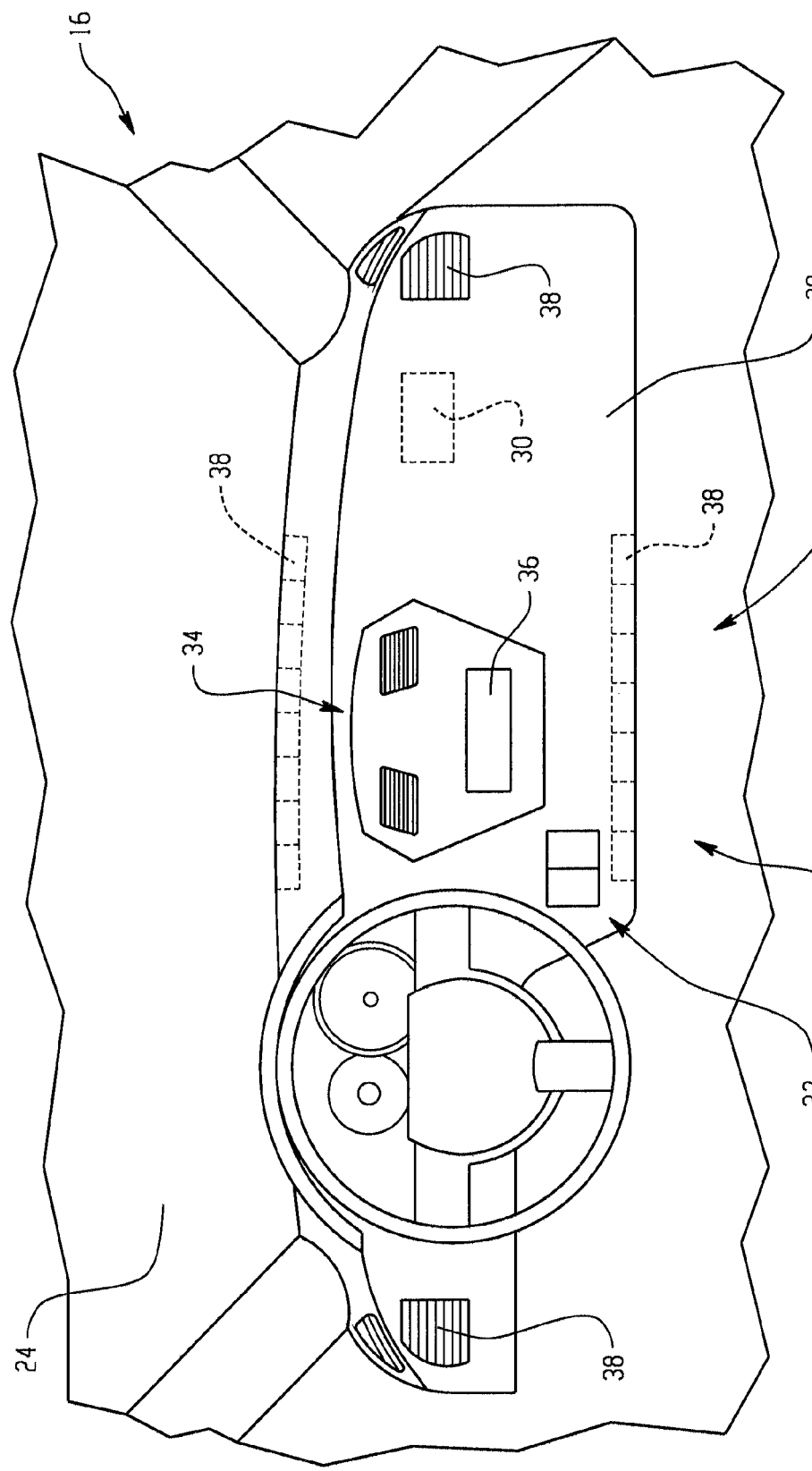
FIG. 2 is a perspective view of an interior of the vehicle of FIG. 1.
Figure 3:
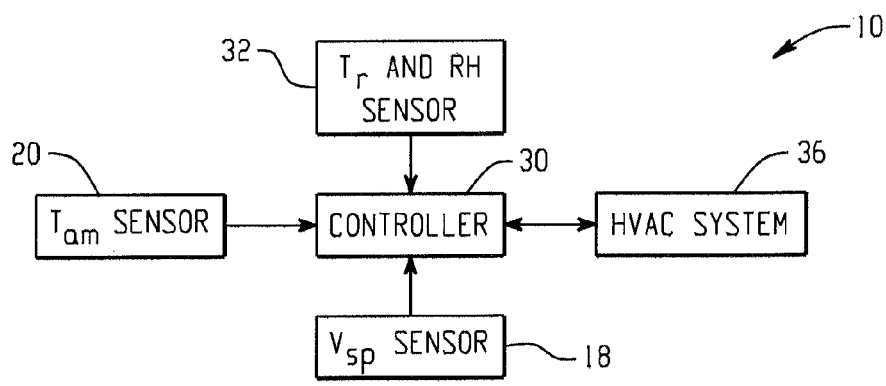
FIG. 3 is a schematic diagram illustrating the relationship between various components of the present invention.

With reference to FIGS. 1-3, an automatic defogging system (ADS) 10 according to the present invention is shown disposed in a vehicle 12. The vehicle 12 includes an engine area 14 and a cabin 16. In or around the engine area 14 are a vehicle speed sensor 18, an ambient air temperature sensor 20, and a front bumper 22. A window 24 is situated around the vehicle 12 so as to provide viewing opportunities into and out of the cabin 16. Many elements of the ADS 10 and an HVAC system 26 are disposed on or around a dashboard 28. With respect to the ADS 10, a controller 30 and an integrated cabin temperature and humidity sensor module 32 are disposed on or around the dashboard 28. With regard to the HVAC system 26, a control panel 34 with a touch screen 36 and outlets 38 are situated on the dashboard 28. The HVAC system 26 further includes at least one fan (not shown) to move air through ducts (not shown) into the cabin 16 through the outlets 38. Further, although not illustrated, it is considered known in the art that an A/C system and a heater system are part of the HVAC system 26. The A/C system supplies cooled air to the cabin 16, while the heater system supplies heated air to the cabin 16.

As will be appreciated, the ADS 10 is incorporated into the vehicle's computer based HVAC system 26, which preferably includes several modes of operation. The ADS 10, as part of the HVAC system 26 and as described hereinafter, is intended to be operational when the HVAC system 26 is operated in an automatic mode of operation and to operate seamlessly as one step or sequence of steps during the automatic mode of operation.

In such an automatic mode, a user selects a set temperature and the controller 30 makes necessary calculations, in response to signals from the ambient air temperature sensor 20, the cabin temperature and humidity sensor module 32, and the speed sensor 18 and one or more predefined programs defining operational characteristics of the HVAC system 26, tuned to the inherent physical characteristics of the vehicle 12. During the automatic HVAC control mode, the activation of the air conditioning (A/C), heater, vent control or activation, and fan speed modulation is automatically controlled in accordance with a computer algorithm that is stored in the controller 30.

The present invention introduces one or more further algorithms, to be described hereinafter, that will be used in conjunction with existing algorithms used during control of the HVAC system 26 in the automatic mode of operation. The one or more further algorithms of the present invention, described hereinafter, are designed to automatically calculate condensation or fogging conditions, and to appropriately activate the HVAC system 26 (A/C, heater, vent control, fan speed) in response thereto. Insofar as the basic operational characteristics of HVAC systems are generally well known in the art, such basic operational characteristics and methods will only be described hereinafter as they relate to the ADS 10 and method of the present invention.

For example, the fan is utilized to move air through the cabin 16. Naturally, it is known in the art that various locations and types of fans may be selected. It is noted that fans are commonly provided on vehicles, and are used, for example, to move air through the ducts and therefore enhance user comfort.

The controller 30 of the present invention is electrically connected with the vehicle speed sensor 18, the ambient air temperature sensor 20, the HVAC system 26, and the integrated cabin temperature and the humidity sensor module 32, as illustrated in FIG. 3. However, other means, such as for example, wireless or fiber-optic communication to connect the controller 30 with the vehicle speed sensor 18, the ambient air temperature sensor 20, the HVAC system 26, and the integrated cabin temperature and the humidity sensor module 32 are also possible and contemplated.

The HVAC control panel 34 may be a series of individual pushbuttons or, preferably, may be provided as the touch screen 36 wherein the user may control operation of the HVAC system 26 via one or more on-screen menus. For example, the user may select the mode of operation (full auto/semi-auto/manual); air conditioning (A/C) operation; heater operation; fresh air/recirculation; as well as select air flow outlets 38 (i.e. via defrost vents, dashboard vents, floor vents, or one or more combinations when in the manual or semi-auto mode of operation) in addition to the set temperature. When in a full-auto mode of operation, the user generally inputs the desired set temperature and the HVAC system 26 responds to sensed conditions in accordance with a predetermined computer algorithm to appropriately activate the HVAC system 26. Naturally, the touch screen 36 may provide various other functions, such as a navigation screen and entertainment center, as is well known in the art.

The ambient air temperature sensor 20 may be disposed at a relatively forward position on the vehicle 12, and may be disposed within an area near the front bumper 22, if desired. Naturally, it is known in the art that various locations for the ambient air temperature sensor 20 may be selected, and therefore the present invention is not limited to the currently preferred ambient air temperature sensor position illustrated herein. It is noted that ambient air temperature sensors are now commonly provided on vehicles, and are used, for example, to permit the user to display the ambient air temperature ($T_{am}$) on the screen 36.

The integrated cabin temperature and humidity sensor module 32 is preferably disposed on the vehicle dashboard 28 adjacent the HVAC control panel 34, as illustrated in FIG. 2. An integrated cabin temperature and humidity sensor module such as sold by Denso Corporation is preferred for various reasons.

For example, the integrated module 32 is available at a significantly reduced cost as compared to individual or separate sensors. Moreover, with a single sensor module sensing both temperature ($T_r$) and humidity (RH) within the cabin 16, the in-cabin physical conditions necessary to detect and respond to possible fogging conditions, as described hereinafter, are derived from a single location, leading to repeatable and consistent results for any given vehicle model. It is also believed that locating the integrated module at this relatively shielded location on the dashboard 28 prevents random environmental influences, such as solar load, from impacting the operation of the sensors. Further, the integrated sensor module 32 is disposed in a location that is relatively easy to install and electrically connect with the HVAC control system without the need to introduce additional steps to the assembly process.

Nevertheless, it is considered apparent that, with regard to some aspects of the invention, use of the preferred integrated sensor module 32 is not mandatory, but rather separate sensors, disposed adjacent to one another, could be used with equal functionality, albeit more expensive to manufacture and assemble. Further, although it is preferred that the temperature and humidity sensors be disposed in a front dashboard, this location is not necessarily mandatory. Rather, the sensors could be moved to any number of locations within the vehicle. Relatively forward locations within the cabin may be considered more desirable since preventing or alleviating window fogging is one aspect of the present invention.

However, while it has been found that it is important that the temperature and humidity sensing is performed at the same location (to determine dewpoint, which is rather constant within the cabin), so long as appropriate calibration is performed, the temperature and humidity sensors can be disposed at any location within the vehicle cabin 16.

In this regard it is noted that humidity is a percentage falling within the range between 0%, which is a total absence of water in the air, and 100%, which is a totally saturated condition. Thus, humidity may sometimes be referred to as absolute humidity.

Relative humidity (RH), on the other hand, is the ratio of the amount of water in the air at a given temperature to the maximum amount of water the air could hold at that temperature, and is expressed as a percentage. Therefore, relative humidity (RH) is adjusted to compensate for the temperature-dependent ability of air to hold water. Thus, there is a strict and well known relationship between ambient air temperature ($T_{am}$), relative humidity (RH), and dewpoint ($T_{dp}$). Essentially, given the relative humidity (RH) and the ambient air temperature ($T_{am}$), the dewpoint ($T_{dp}$) may be easily derived.

The present invention takes advantage of this fact, and calculates the dewpoint ($T_{dp}$) based upon the sensed cabin temperature ($T_r$) and the sensed relative humidity (RH) in the cabin 16 provide by the integrated sensor module 32. Preferably, this information is stored in a lookup table in the controller 30 such that, by inputting the sensed cabin temperature ($T_r$) and relative humidity (RH), a corresponding dewpoint ($T_{dp}$) is output.

In one embodiment, a window glass temperature ($T_{glass}$) determination provided by the present invention does not require any additional sensors, but rather takes advantage of sensors (speed 18 and ambient air temperature 20) that are already conventionally provided by the vehicle 12 and, as such, adds functionality to the vehicle 12 without increasing the component cost thereof. Preferably, by inputting the ambient air temperature ($T_{am}$) and vehicle speed ($V_{sp}$), a corresponding window glass temperature ($T_{glass}$) is output from a lookup table in the controller 30 and the window glass temperature ($T_{glass}$) is used for further calculations.

However, although the present invention thus far has focused on obtaining the window glass temperature ($T_{glass}$) as a function of vehicle speed ($V_{sp}$) and ambient air temperature ($T_{am}$), it is understood that other devices/methods are possible and contemplated. In an alternate embodiment, the window glass temperature ($T_{glass}$) is determined with a contact type temperature sensor. Alternatively, a non-contact type temperature sensor could be employed to ascertain the window glass temperature ($T_{glass}$). Although not illustrated, the usage of such contact and non-contact sensors is known and contemplated.

In a simplified automatic HVAC control system it would seem clear that, based upon the definition of dewpoint ($T_{dp}$), so long as the window glass temperature ($T_{glass}$) is greater than the dewpoint ($T_{dp}$), no condensation or fog will form and, conversely, when the glass temperature ($T_{glass}$) is equal to or below the dewpoint ($T_{dp}$), a fogging condition exists (i.e., condensation or fog will form on the glass). Therefore, it would be possible to control the HVAC system so that an appropriate mode of operation (A/C and/or defrost) is activated when the glass temperature ($T_{glass}$) is equal to or less than the dewpoint ($T_{dp}$). Such a control system may work satisfactorily in some situations, and definitely provides a better result than the HVAC system lacking fog condition calculations.

However, as previously disclosed, many vehicular humidity sensors have difficulty in accurately measuring relative humidity (RH) during low ambient air temperatures ($T_{min}$) when the relative humidity (RH) is less than 10%. Accordingly, the sensed relative humidity (RH), and subsequent dewpoint ($T_{dp}$) may not be accurate and may be too large. This higher than actual value may result in a false positive for fog presence during subsequent calculation of a fog margin (FM). A low ambient air temperature ($T_{min}$) is a predetermined value, and has been found to generally be any temperature less than or equal to 0° C., and more specifically, any temperature less than or equal to −7° C. However, other conditions and factors could cause this value to be different.

The calculated fog margin (FM) is determined based upon the equation:

Fog Margin(FM)=Window Glass Temperature ($T_{glass}$)−Dewpoint($T_{dp}$).

It has been experimentally determined that the calculated fog margin value (FM) causes an over activation of the HVAC system 26 during low ambient air temperatures ($T_{am} \leq T_{min}$). This results in the users being exposed to unnecessary air currents and noise from the fan. Therefore, when the ambient air temperature ($T_{am}$) is low ($\leq T_{min}$), a corrected fog margin (FM'), preferably determined from a lookup table, is desired. The corrected fog margin (FM') is larger than the calculated fog margin (FM), described hereinbefore. Accordingly, when the controller uses the corrected fog margin (FM') the controller 30 operates the fan at a reduced voltage, and thus at a reduced speed, as compared to if the calculated fog margin (FM) were used. By utilizing the corrected fog margin (FM') in place of the calculated fog margin (FM) when the ambient air temperature ($T_{am}$) is low ($\leq T_{min}$), the users will not be exposed to excessive airflow or noise from the fan. Instead, when the controller 30 employs the corrected fog margin (FM') to control the fan to prevent the formation of fog on the window 24, only an adequate supply of air is dispatched to the cabin 16.

Figure 4:
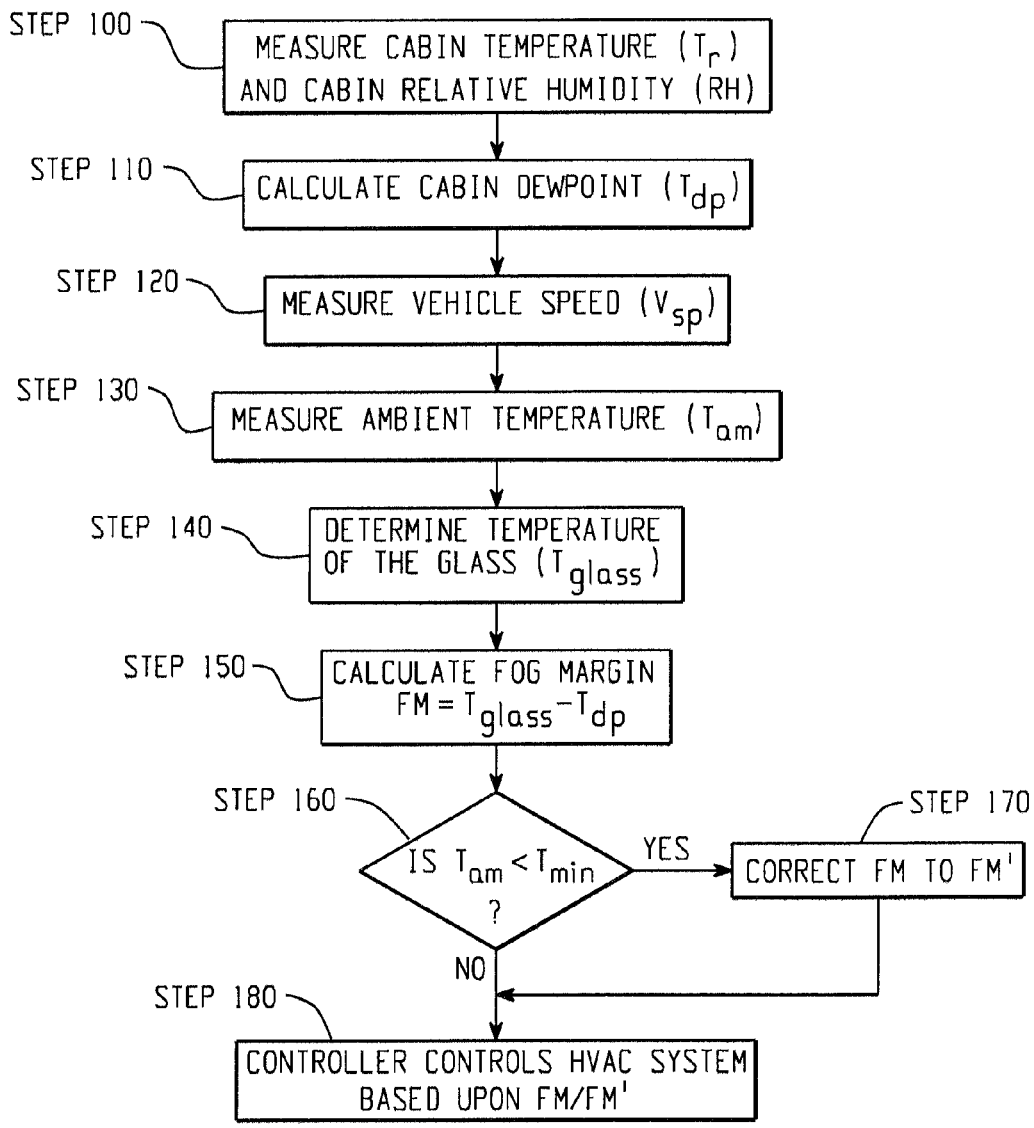
FIG. 4 is a flowchart illustrating a method of using the present invention.

A method of using the present invention is illustrated in FIG. 4. In Step 100, the cabin temperature ($T_r$) and cabin relative humidity (RH) are measured. Then, the cabin dewpoint ($T_{dp}$) is determined (Step 110). The vehicle speed ($V_{sp}$) and the ambient air temperature ($T_{am}$) are also measured (Steps 120, 130). Next, the window glass temperature ($T_{glass}$) is determined (Step 140). This can be done via estimation/calculation or by measuring the window 24 with a contact or non-contact type sensor. In Step 150, the fog margin (FM) is calculated. In Step 160, it is determined if the ambient air temperature ($T_{am}$) is less than or equal to the low ambient air temperature ($T_{min}$). If the ambient air temperature ($T_{am}$) is less than or equal to the low ambient air temperature ($T_{min}$), the calculated fog margin (FM) is modified, based upon a lookup table (Step 170), to be equal to a corrected fog margin (FM'). Alternatively, if the ambient air temperature ($T_{am}$) is greater than the low ambient air temperature ($T_{min}$), the calculated fog margin (FM) remains unchanged. Finally, the controller 30 controls the HVAC system 26 based upon the calculated/corrected fog margin (FM/FM') (Step 180).

By taking into account the ambient air temperature ($T_{am}$), the present invention more accurately senses when conditions are favorable for fogging of the window 24 and takes the appropriate actions to adequately prevent the fogging. This ensures that the formation of fog is eliminated/reduced, while not exposing the user to excessive noise or airflow from the fan.

As described hereinabove, the present invention solves many problems associated with previous type devices. However, it will be appreciated that various changes in the details, materials and arrangements of parts, which have been herein described and illustrated in order to explain the nature of the invention, may be made by those skilled in the art without departing from the principle and scope of the invention, as expressed in the appended claims.

What is claimed is:

1. A method for controlling a vehicle HVAC system to reduce a likelihood of fog forming on a window glass of the vehicle, comprising the steps of:

calculating a dewpoint of air within a cabin of said vehicle;
measuring ambient air temperature;
determining a window glass temperature;
calculating a fog margin based upon said window glass temperature and said calculated dewpoint,
wherein, when the ambient air temperature is judged to be below a predetermined low temperature, a corrected fog margin is used in place of the calculated fog margin; and
operating said HVAC system in accordance with a predetermined algorithm based upon ambient air temperature and the calculated fog margin when the ambient air temperature is at or above the predetermined low temperature and the corrected fog when the ambient air temperature is below the predetermined low temperature.

2. The method for controlling the vehicle HVAC system according to claim 1, wherein said dewpoint calculating step includes the steps of:
measuring a relative humidity of air within the cabin of said vehicle;
measuring an interior temperature of air within the cabin of said vehicle; and,
determining said dewpoint based upon said measured interior air temperature and the relative humidity.

3. The method for controlling the vehicle HVAC system according to claim 1, wherein said fog margin determining step includes the step of:
subtracting the dewpoint from the window glass temperature.

4. The method for controlling the vehicle HVAC system according to claim 1, wherein said HVAC system operating step includes the step of:
supplying a reduced voltage to a fan when ambient air temperature is below the predetermined low temperature as compared to when ambient air temperature is at or above the predetermined low temperature, so as to operate the fan at a reduced speed.

5. The method for controlling the vehicle HVAC system according to claim 1, further including the step of:
measuring a speed of the vehicle.

6. The method for controlling the vehicle HVAC system according to claim 5, wherein said window glass temperature determining step includes the step of:
calculating said window glass temperature based upon the vehicle speed and the ambient air temperature.

7. The method for controlling the vehicle HVAC system according to claim 1, wherein said predetermined low temperature is about 0° C.

8. The method for controlling the vehicle HVAC system according to claim 1, wherein said predetermined low temperature is about −7° C.

* * * * *